May 22, 1934.   H. P. GAGE   1,960,148
LENS
Filed Nov. 18, 1932
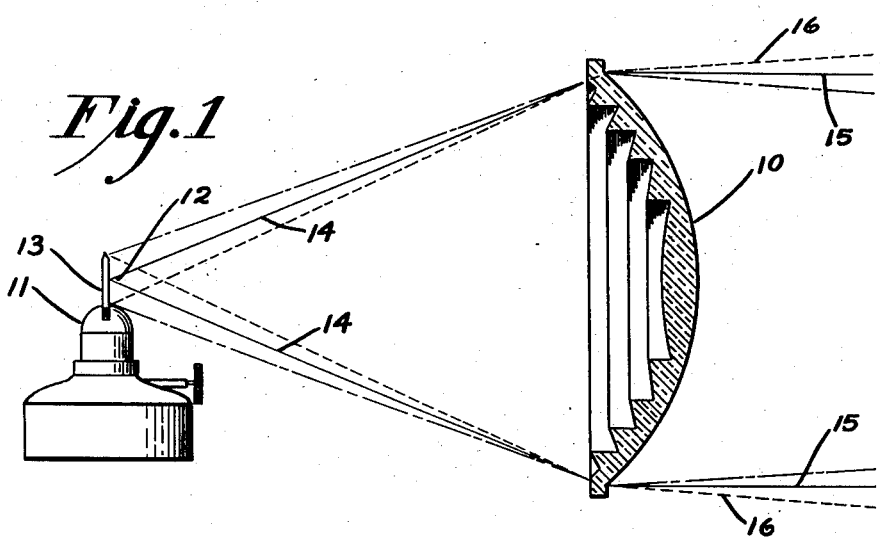
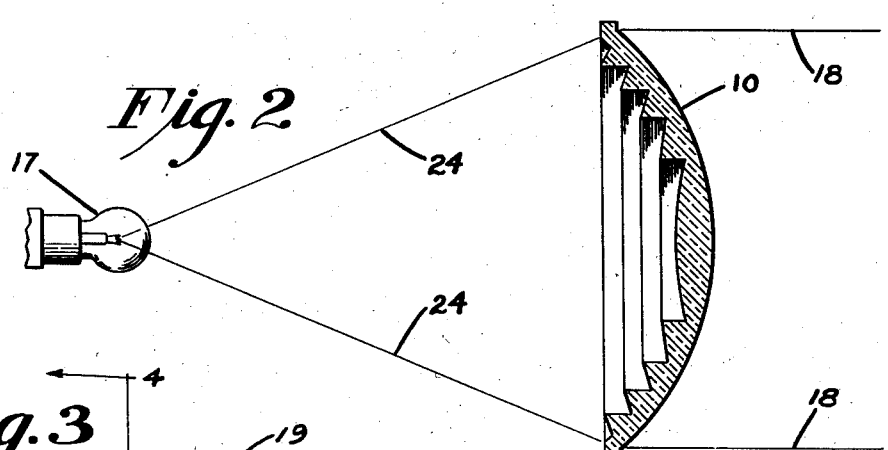
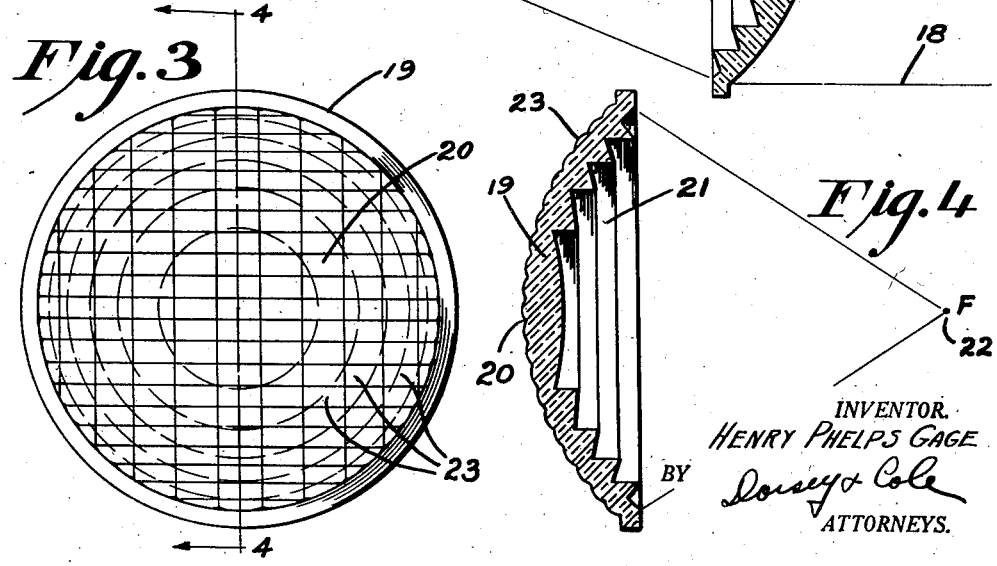
INVENTOR.
HENRY PHELPS GAGE
BY Dorsey & Cole
ATTORNEYS.

Patented May 22, 1934

1,960,148

UNITED STATES PATENT OFFICE 1,960,148

LENS

Henry Phelps Gage, Corning, N. Y., assignor to Corning Glass Works, Corning, N. Y., a corporation of New York Application November 18, 1932, Serial No. 643,251

2 Claims. (Cl. 240—106.1)

This invention relates to lenses, and more particularly to lenses used on signal or switch lamps.

In the manufacture of lenses for signalling purposes, it is customary to so design the curvatures of the front and rear faces as to bring parallel incident rays projected on the front face of the lens to a focus at a point in the rear of the lens. This results in a lens having what may be termed a point focus. When a light source of considerable area such as the flame of a kerosene lamp is placed at the focus of such a lens there is produced an intense beam of parallel light surrounded by a less intense beam of divergent light. Such lenses have been used in switch lamps for many years with light sources of large area and have proven entirely satisfactory as due to the divergent rays emitted, the signal was visible over a considerable angle. However, with the advent of the electric lamp which employs a very small filament, the source of illumination has been greatly reduced in size and while in combination it produces a beam of parallel light of high intensity and long range, there is but little spreading of the beam with the result that the angle of visibility is considerably lessened. As a result the lenses heretofore suitable for certain kinds of signalling lose much of their value when employed with an electric lamp.

The primary object of the present invention is a lens which when employed with a point source of illumination will produce a beam having a wide angle of visibility so as to simulate that produced by an ordinary optical lens used in conjunction with a source of illumination of considerable area such as a kerosene flame.

Another object of this invention is to secure a plurality of dispersing elements, each of which will furnish the necessary angular spread so that from a moderate distance light appears to come from each of these elements and at a considerable distance light appears to come from the entire surface of the lens and not from a restricted part of its area.

This and other objects may be accomplished by employing my invention which embodies among its features a lens, one of the faces of which is covered with horizontal and vertical rectilinear rows of contiguous refracting elements.

A specific embodiment of my invention is described below and shown in the accompanying drawing in which;

Fig. 1 is a diagrammatic view showing the beam produced when an ordinary signal lens of the Fresnel type is used in conjunction with a light source of considerable area;

Fig. 2 is a view similar to Fig. 1 showing the beam produced when an ordinary signal lens of the Fresnel type is used in conjunction with a point source of illumination;

Fig. 3 is a front view in elevation of my improved lens; and

Fig. 4 is a vertical sectional view taken on the line 4—4 of Fig. 3;

Referring to the drawing in detail and particularly Fig. 1 thereof, I show a lens 10 of the Fresnel type in use with a kerosene burner 11 of the type ordinarily used for railway signalling. The lens 10 is designed to focus at a point 12 and the flame 13 of the burner 11 is located in a plane with the focus of the lens. The light emitted from the flame 13 in the focal point 12 emerges as a conical bundle defined between the lines 14 and after passing through the lens emerges from the signal in the form of a parallel beam or bundle of rays which is defined by the lines 15. The light emitted from the flame 13 outside of that within the conical bundle 14 falls upon the lens 10 in such a manner as to produce a spreading beam of less intensity as indicated by the dotted lines 16. This performance can be readily understood upon consulting United States Patent #851,495 issued to William Churchill, April 23, 1907.

In using the lens 10 above described with an electric lamp 17 as shown in Fig. 2, it becomes evident that due to the condensed nature of the light source the beam defined between the lines 18 will be composed of parallel rays and very little spreading effect is produced. While in many instances such as in long range signalling a highly concentrated beam is desirable, it is not suited to use in switch lamps such as are commonly employed in and about railroad yards. This is due to the limited angle of visibility of the long range beam which can be seen only within a relatively narrow path.

My invention comprehends the use of a lens 19 (Fig. 3) having a substantially spherical front face 20 and a corrugated rear face 21, the curvatures of which are designed to converge parallel incident rays upon a focal point 22 and these curvatures will vary according to the focal length of the lens and the refractive index of the glass from which the lens is made. In order to produce the desired dispersion of the beam the front face 20 is provided with a plurality of vertical and horizontal rows of contiguous refracting elements 23 which in the present instance are convex and are twice as long as they are wide, though it is obvious that they may be made concave or flat and of differing properties. It is to be understood however that in some instances I may find it desirable to form these refracting elements on the rear face of the lens and that such a construction falls within the scope of my invention.

In using such a lens a source of illumination such as the electric lamp 17 is placed at the focal point 22 and the conical bundle of light defined between the lines 24 will impinge upon the rear face 21 of the lens 19. Passing through the lens the light will be refracted so that it issues from the front face as a spread beam, the horizontal spread of which will be about twice the vertical spread. In the present lens the horizontal spread is about eight degrees (8°) and the vertical spread amounts to about four degrees (4°). This construction of lens when used with a point source of illumination has been found to compare very favorably with a Fresnel type lens using a source of illumination of considerable area and hence lends itself most admirably to modern illuminating practice.

In the above I have shown my invention as applied to a lens of the Fresnel type but it is to be understood that it may be used in conjunction with any type of lens where such a spreading effect of the beam is desirable.

By "optical lens" as used herein, I mean a lens which collects the light rays and projects them in the form of a beam.

While in the foregoing, there has been shown and described the preferred embodiment of my invention, it is to be understood that minor changes in the construction, combination and arrangement of parts may be resorted to without departing from the spirit and scope of the invention as claimed.

What I claim is:

1. An optical lens having a plurality of refracting elements on one surface, said elements being arranged in horizontal and vertical rectilinear rows and consisting of convex surfaces having a width equal to substantially twice their height, the elements being positioned at such angles to the axis of the lens as to refract the light in a vertical and horizontal direction.

2. An optical lens having on one surface a plurality of rectilinear spaced ridges dividing it horizontally, a plurality of rectilinear ridges perpendicular to the horizontal ridges, said ridges dividing the surface vertically and horizontally into contiguous rectangular refracting areas the width of each of which is substantially twice its height whereby light passing through the lens is refracted and spread both vertically and horizontally with the horizontal spread exceeding the vertical spread.

HENRY PHELPS GAGE.